United States Patent [19]

Tangri

[11] 4,085,709
[45] Apr. 25, 1978

[54] HYDROGEN FUEL SYSTEM FOR A VEHICLE

[76] Inventor: Kuldip Chand Tangri, 5126 W. Concord, Chicago, Ill. 60639

[21] Appl. No.: 637,736

[22] Filed: Dec. 4, 1975

[51] Int. Cl.² ............................................. F02B 43/10
[52] U.S. Cl. ........................... 123/1 A; 123/DIG. 12; 123/3; 123/119 E
[58] Field of Search ................ 123/DIG. 12, 3, 1 R, 123/1 A, 119 E; 180/65 B, 65 A

[56] References Cited

U.S. PATENT DOCUMENTS

| | | | |
|---|---|---|---|
| 1,876,879 | 9/1932 | Drabold | 123/DIG. 12 |
| 2,365,330 | 12/1944 | Carmichael | 123/DIG. 12 |
| 3,459,953 | 8/1969 | Hughes et al. | 123/DIG. 12 |
| 3,608,660 | 9/1971 | Smith et al. | 123/DIG. 12 |
| 3,648,668 | 3/1972 | Pacheco | 123/DIG. 12 |
| 3,672,341 | 6/1972 | Smith et al. | 123/DIG. 12 |
| 3,696,795 | 10/1972 | Smith et al. | 123/DIG. 12 |
| 3,939,806 | 2/1976 | Bradley | 123/3 |

Primary Examiner—Charles J. Myhre
Assistant Examiner—Ira S. Lazarus

[57] ABSTRACT

The system is used with an internal combustion engine, is mounted on a vehicle and is operable primarily when the vehicle is at rest for generating and storing hydrogen gas on the vehicle. The system includes a gas cylinder, an electrolyzer connected to the gas cylinder, a D.C. power supply connected to the electrolyzer and including electrical apparatus for converting A.C. current to D.C. current and a control circuit connected to the D.C. power supply, to the electrolyzer, and to the gas cylinder, all of which are mounted within the vehicle. The control circuit for controlling generation and storage of hydrogen gas is operable from and connectible to a conventional A.C. source.

12 Claims, 3 Drawing Figures

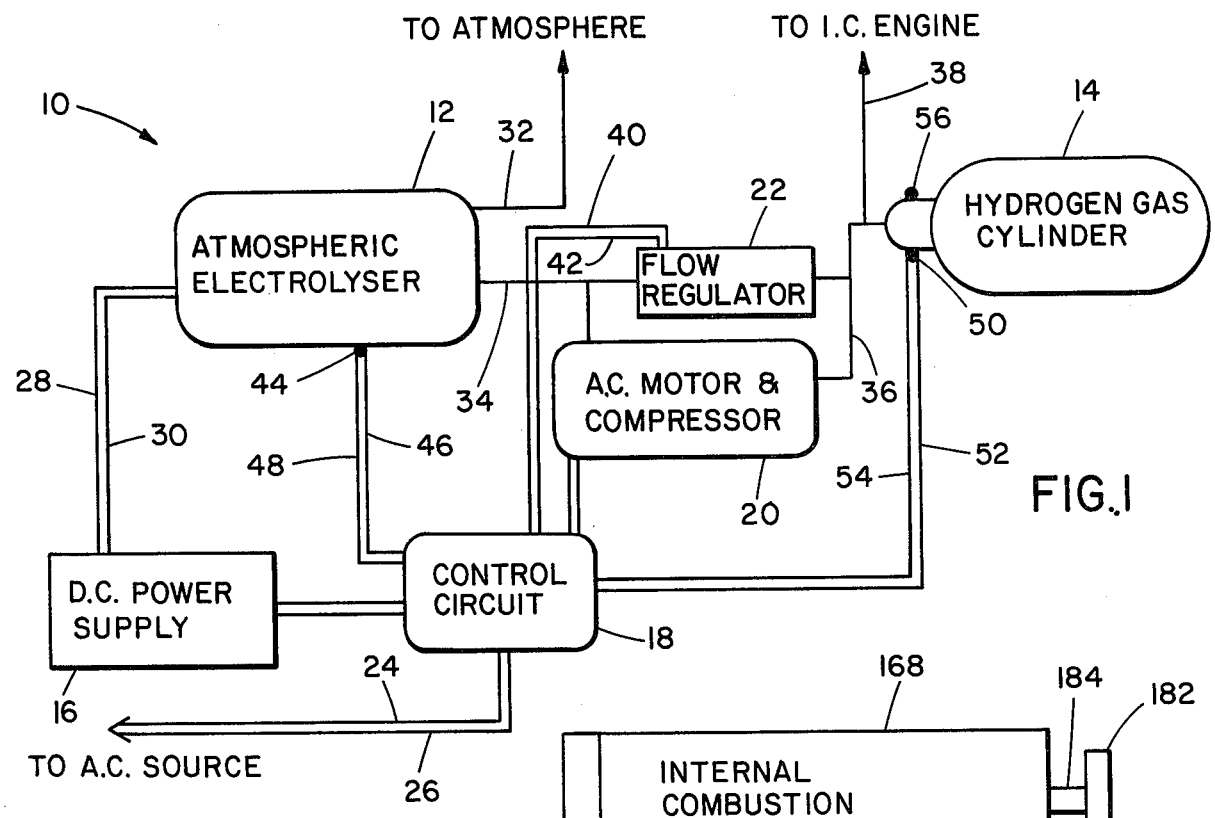
FIG. 1
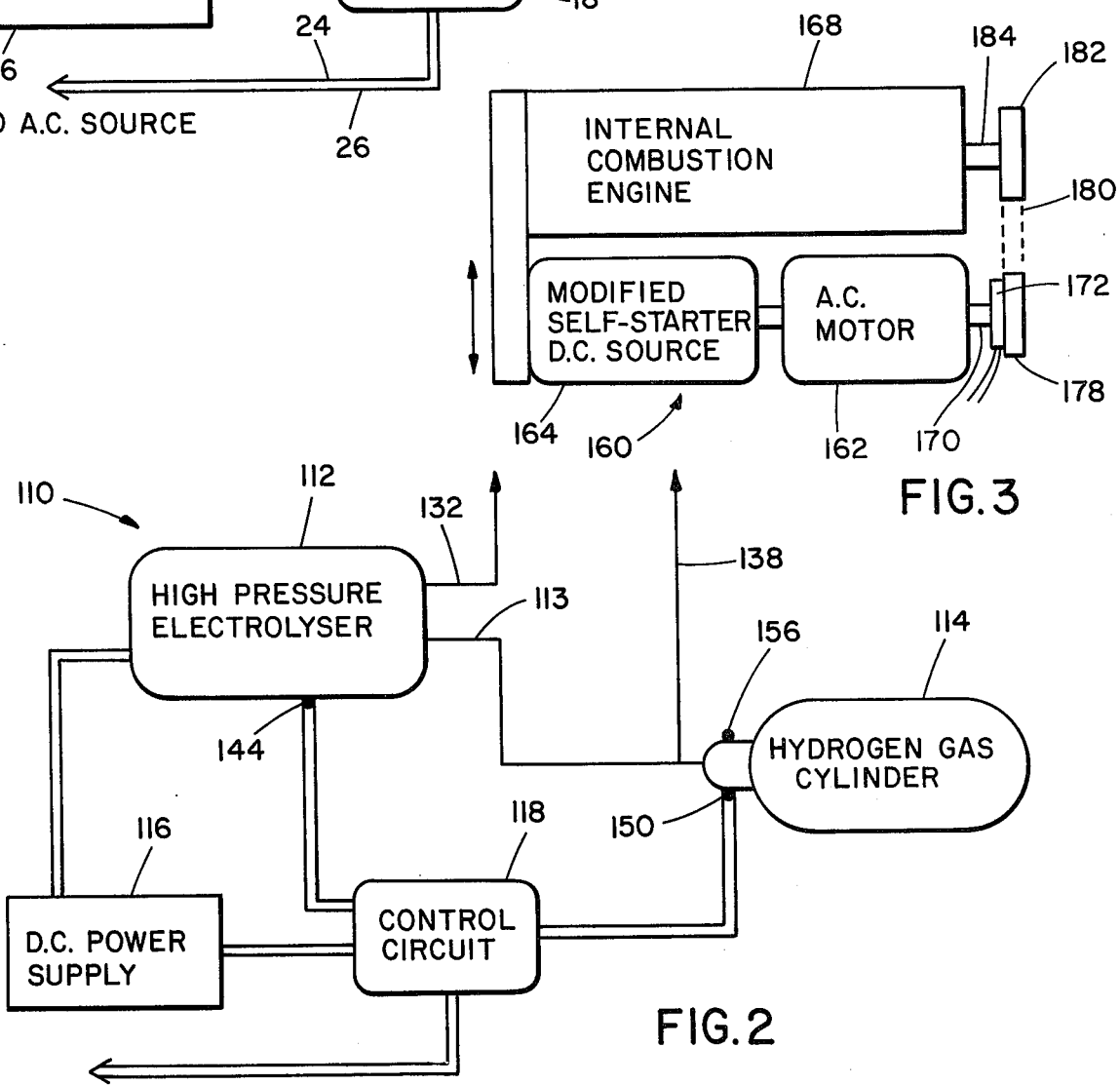
FIG. 3
FIG. 2

HYDROGEN FUEL SYSTEM FOR A VEHICLE

BACKGROUND OF THE INVENTION

1. The Field of the Invention

The field of the invention is a hydrogen fuel system for a vehicle powered by an internal combustion engine. Many systems of this type are presently classified in Class 123, subclass 1.

2. Description of the Prior Art

Heretofore, various proposals have been made for utilizing hydrogen gas as a fuel for internal combustion engines. Recently there has been greater interest in the use of hydrogen as a fuel for internal combustion engines, particularly for automobile engines in place of gasoline, in view of (1) the problem of air pollution and (2) the depletion of the world's oil supply from which gasoline is derived. Also, hydrogen is becoming more attractive as a fuel since: (1) more energy is derived from the combustion of a given amount of hydrogen than is obtained from an equivalent amount, by weight, of gasoline; (2) hydrogen is easily obtained from the electrolysis of water which is in great abundance; and (3) the main product of combustion of hydrogen is water which does not contaminate the environment. The recent interest in hydrogen as a fuel for internal combustion engines is exemplified by the experimental hydrogen fueled automobile described in a pamphlet entitled, "UCLA HYDROGEN CAR" published as Paper No. 730,507 by the Society of Automotive Engineers in May, 1973.

Hydrogen gas is very explosive and therefore requires special handling. In view of the special problems that arise in handling hydrogen gas, various proposals have been made relative to the generation, storage and use of hydrogen gas in a vehicle. In this respect, reference may be had to the various hydrogen systems disclosed in the following patents: U.S. Pat. Nos.: 3,572,297, 3,608,529, 3,648,668, 3,672,341.

In U.S. Pat. No. 3,608,529 it is proposed to locate an electrolyzer at a service station. Hydrogen and oxygen storage tanks are also situated at the service station for collecting hydrogen and oxygen from the electrolyzer. The service station also will have suitable outlets for connecting the storage tanks to conduits in a vehicle leading to respective hydrogen and oxygen storage tanks mounted on the vehicle. This arrangement requires valves in the outlets from the service station storage tanks and valves in the conduits leading to the vehicle storage tanks.

In U.S. Pat. No. 3,648,668, it is proposed to mount a hydrogen gas generator on the vehicle along with a pump and reserve tank. Also, to increase the output of hydrogen gas from the hydrogen gas generator, this patent proposes the use of a magnesium electrode which will decompose and need frequent replacement.

As will be described in detail hereinafter, the hydrogen fuel system of the present invention provides a relatively self-contained system for fueling an internal combustion engine on a vehicle with hydrogen gas, which system is mounted on the vehicle and does not require frequent replacement of electrodes or frequent connection and disconnection to hydrogen gas storage tanks.

SUMMARY OF THE INVENTION

According to the invention, there is provided a hydrogen fuel system for a vehicle powered by an internal combustion engine, said system being mounted on the vehicle and comprising gas storage means for storing hydrogen gas, said storage means being connected to a fuel input for the internal combustion engine, an electrolyzer for generating hydrogen gas which is stored in said gas storage means, a D.C. power supply having an output connected to said electrolyzer and including means for converting A.C. current to D.C. current, and control circuit means connected to said D.C. power supply, to said electrolyzer and to said gas storage means for controlling the generation and storage of hydrogen gas, said control circuit means being operable from and connectible to a conventional A.C. source.

BRIEF DESCRIPTION OF THE DRAWING

FIG. 1 is a schematic, block diagram of one embodiment of the hydrogen fuel system of the present invention;

FIG. 2 is a schematic, block diagram of another embodiment of the hydrogen fuel system of the present invention; and FIG. 3 is a schematic, block diagram showing the use of an A.C. motor-D.C. generator set for the D.C. power supply of the hydrogen fuel system.

DESCRIPTION OF THE PREFERRED EMBODIMENTS

Referring now to the drawing in greater detail, one embodiment of the hydrogen fuel system of the present invention is schematically illustrated in FIG. 1 and generally identified by reference numeral 10. The system 10 is mounted on a vehicle (not shown) and includes an internal combustion (I.C.) engine (not shown in FIG. 1), an electrolyzer 12, a hydrogen gas storage cylinder 14, a D.C. power supply 16, a control circuit 18, an A.C. motor-compressor unit 20, and a flow regulator 22.

The control circuit 18 is adapted to be connected via input lines 24 and 26 to a conventional A.C. source and is operable to supply A.C. current to the D.C. power supply 16 which converts the A.C. current to regulated D.C. current which is supplied via conductors 28 and 30 to the electrolyzer 12.

The electrolyzer 12 operates under atmospheric conditions and for that reason is identified as an atmospheric electrolyzer. An oxygen output 32 from the electrolyzer 12 is vented to atmosphere and a hydrogen gas output 34 is connected to the input of a motor-compressor unit 20. An output 36 of the unit 20 is connected to an input to the hydrogen gas cylinder 14 and to a fuel line 38 leading to the I.C. engine. The flow regulator 22 is connected between the input-output of the motor-compressor unit 20 and is connected via conductors 40 and 42 to the control circuit 18.

The electrolyzer 12 is provided with a sensing or monitoring device generally identified by reference numeral 44 which is connected via conductors 46 and 48 to the control circuit 18. The hydrogen gas cylinder 14 is also provided with a sensor or monitoring device generally identified by reference numeral 50, which is connected via conductors 52 and 54 to the control circuit 18. Additionally, the hydrogen gas cylinder 14 has a venting valve 56 for relieving the pressure of hydrogen gas in the cylinder 14.

The D.C. power supply 16 includes a regulator of known type (not shown) for regulating the D.C. voltage and/or current supplied to the electrolyzer 12 and apparatus for converting the A.C. current to D.C. current, such as rectifiers or a motor-generator set as will be explained in more detail in connection with the description of FIG. 3.

The system 10 is operable primarily when the vehicle is at rest, in other words, when the vehicle is parked in the owners garage. At that time the lines 24 and 26 are connected to a suitable A.C. source via a male-female plug arrangement. The control circuit 18 will then energize the D.C. power supply 16 which provides regulated D.C. current to the electrolyzer 12 which in turn begins generating oxygen and hydrogen. The control circuit 18 also causes operation of the motor-compressor unit 20 so that hydrogen gas at the outlet 34 of the electrolyzer 12 is compressed and then supplied to the cylinder 14.

It is to be understood that the electrolyzer 12 is of known type and the hydrogen outlet 34 has a one way valve (not shown) which permits hydrogen gas to escape from the electrolyzer 12 but which will stop hydrogen gas from flowing back into the electrolyzer 12. Also it is to be understood that the fuel line 38 has a valve therein (not shown) which prevents gas from flowing to the I.C. engine when the engine is not running. In this way, the cylinder 14 is filled with the hydrogen gas produced by electrolyzer 12 and compressed by the motor-compressor unit 20.

When a sufficient amount of hydrogen gas has been generated and stored in the cylinder 14, the sensor 50 will cause the control circuit 18 to de-energize the power supply 16 and the motor-compressor unit 20. Also, if an abnormality in the operation of the electrolyzer 12 is sensed by the sensor 44, the control circuit 18 will de-energize the D.C. power supply 16 and the motor-compressor unit 20.

If for some reason the electrolyzer 12 does not produce sufficient hydrogen gas such that the motor-compressor unit 20 creates a vacuum at the hydrogen gas outlet 34, the flow regulator 22 will operate to cause hydrogen gas to be circulated through the motor-compressor unit 20. If the amount of recirculation is excessive, the flow regulator 22 will send a signal via the conductors 40 and 42 to the control circuit 18 to cause the control circuit 18 to de-energize the power supply 16 and the motor-compressor unit 20.

In FIG. 2 there is illustrated a modified hydrogen fuel system 110 constructed in accordance with the teachings of the present invention. In the system 110, the flow regulator 22 and the motor-compressor unit 20 are eliminated. Instead, the system 110 utilizes a high pressure electrolyzer 112 of known type having a hydrogen gas outlet 113 which is connected directly to, and which supplies pressurized hydrogen gas directly to, a hydrogen gas cylinder 114. In other respects, the system 110 is identical to the system 10 and includes a D.C. power supply 116, a control circuit 118, an oxygen vent 132 from the electrolyzer 112 and a fuel line 138 leading from the input-output to the gas cylinder 114. Additionally a monitoring device or sensor 144 is associated with the electrolyzer 112 and connected to the control circuit 118. Likewise the hydrogen gas cylinder 114 has a monitor or sensing device 150 connected to the control circuit 118 and has a venting valve 156. The hydrogen fuel system 110 functions in essentially the same manner as the hydrogen fuel system 10.

As stated above, the D.C. power supply 16 or 116 may include static, solid-state rectifiers of known type or a dynamic, motor-generator unit for converting A.C. current to D.C. current. In FIG. 3 there is illustrated an A.C. motor-D.C. generator unit 160 comprising an A.C. motor 162 and a D.C. generator 164. The D.C generator 164 is actually a modified D.C. starter motor utilized in starting an internal combustion engine generally identified by the reference numeral 168. The modified starter motor 164 for the I.C. engine 168 is modified by having a compound wound stater which, through suitable connections and switches, is connected as a D.C. motor when it is utilized for starting the I.C. engine 168. However, it is connected as a D.C. shunt generator when it is driven by the A.C. motor 162. It will be understood that when the motor-generator 164 is used as a starter motor, it is moved into engagement with the fly wheel for the internal combustion engine 168. However, when the engine 168 is running or is at rest, the D.C. motor-generator 164 will be disengaged from the fly wheel.

When the engine 168 is at rest and the control circuit 18 is actuated, the A.C. motor 162 is energized and drives the D.C. motor-generator 164 as a generator. The regulated output current and voltage from the generator 164 is then supplied to the electrolyzer 12 or 112.

It has been found that the fuel valve of hydrogen generated by electrolysis is 120% of the heating value of the electrical energy supplied to generate the hydrogen at 25° C. Thus, under ideal conditions a water electrolyzer could have a theoretical "thermal" efficiency of up to 120%. This characteristic of hydrogen is more fully described in a book entitled "*Hydrogen as a Fuel*", distributed by the National Technical Information Service of the U.S. Department of Commerce under catalog no. AD-787 484, published Aug. 31, 1974. Since theoretically a net gain in energy can be obtained through the electrolysis-combustion of hydrogen and since there are many operating conditions of a vehicle where the I.C. engine is operating at idle, it may be economical to operate the electrolyzer 12 or 112 during operation of the engine 168. For this purpose, a shaft 170 of the A.C. motor 162 is connected via an electric clutch 172 to a pulley 178 coupled by a belt 180 to a pulley 182 mounted on an output shaft 184 of the I.C. engine 168. Suitable electrical circuitry is provided in the control circuit 18 or 118 to cause actuation of the clutch 172 when the engine 168 is running. Also, if desired such circuitry can be actuated only when the vehicle is not moving.

Also, to ensure adequate generation of hydrogen within a relatively constant operating temperature range, the electrolyzer 12 or 112 can be equipped with a suitable heating or cooling apparatus.

Although conventional hydrogen gas cylinders 14 or 114 can be provided for storing the hydrogen gas, the system 10 or 110 can also utilize compartments in the chassis or frame of the vehicle. In this respect portions of the frame can be made of heavy duty metal tubes providing hollow compartments therein which can serve as storage space for hydrogen gas generated by the electrolyzer 12 or 112. Since hydrogen has a small molecule, hydrogen gas cylinders are normally thick and rather heavy. Thus, by utilizing thick metal tubes not only for segments of the vehicle frame but also as storage space for the hydrogen gas, a space and weight savings can be obtained. In other words, since hollow compartments within portions of the frame are being utilized for storing the hydrogen gas, the need for separate gas cylinders is eliminated.

From the foregoing description it will be apparent that the hydrogen fuel system 10 or 110 of the present invention has a number of advantages some of which have been described above and others of which are inherent in the invention. Of course, the principal advantage of the system 10 or 110 is that it is a substantially self-contained unit which does not require handling of the hydrogen gas. In this respect the only regular maintenance required for the system 10 or 110 is the refilling of the electrolyzer with water. Also the system 10 or 110 does not require the need for special electrodes or the need for periodically recharging the gas cylinders with hydrogen gas. Instead, an operator can utilize electrical energy supplied from the local electric utility for generating hydrogen gas.

Also, it will be apparent from the foregoing description that various modifications and variations can be made to the hydrogen fuel system of the present invention, some of which modifications and variations have been described above, without departing from the spirit or scope of the invention. Accordingly, the scope of the invention is only to be limited as necessitated by the accompanying claims.

I claim:

1. A hydrogen fuel system for a vehicle powered by an internal combustion engine, said system being mounted on the vehicle and comprising gas storage means for storing hydrogen gas, said storage means being connected to a fuel input for the internal combustion engine, an electrolyzer for generating hydrogen gas which is stored in said gas storage means, a D.C. power supply having an output connected to said electrolyzer and including means for converting A.C. current to D.C. current, and control circuit means connected to said D.C. power supply to said electrolyzer and to said gas storage means for controlling the generation and storage of hydrogen gas, said control circuit means being operable from and connectible to a conventional A.C. source.

2. The system according to claim 1 wherein said D.C. power supply includes rectifying circuit means for rectifying A.C. current to D.C. current.

3. The system according to claim 1 wherein said electrolyzer operates at atmospheric pressure and said system further includes a gas compressor connected between the output of said electrolyzer and said gas storage means and driven by an A.C. motor connected to said control circuit means.

4. The system according to claim 3 including a flow regulator connected beween the input and output of said compressor and wherein said control circuit means is connected to said flow regulator and is operative when said flow regulator bypasses an excessive amount of hydrogen gas from the output to the input of said compressor to stop operation of said electrolyzer and said A.C. motor driving said compressor.

5. The system according to claim 1 wherein said electrolyzer is a high pressure electrolyzer and the hydrogen gas output from said electrolyzer is connected directly to said gas storage means.

6. The system according to claim 1 wherein said means for converting A.C. current to D.C. current includes a motor-generator set comprising an A.C. motor electrically connected to said control circuit means and a D.C. generator mechanically coupled to said A.C. motor.

7. The system according to claim 6 wherein said D.C. generator is a modified D.C. starter motor which is utilized for starting the internal combustion engine and which is modified so that when driven by said A.C. motor it produces D.C. current and wherein said D.C. power supply regulates the D.C. current supplied by said D.C. generator to said electrolyzer.

8. The system according to claim 7 wherein said A.C. motor is coupled through an electric clutch mechanism to an output shaft of the internal combustion engine and wherein said control circuit means are operable to energize said electric clutch mechanism whereby said A.C. motor can be mechanically driven by the internal combustion engine.

9. The system according to claim 1 wherein said control circuit means includes means for monitoring the operation of said electrolyzer and are operative to stop operation of said electrolyzer when said monitoring means senses an abnormality in the operation thereof.

10. The system according to claim 1 wherein said gas storage means has a venting valve and said control circuit means includes monitoring means which are connected to said gas storage means and are operative to stop operation of said electrolyzer and, if necessary, to open said venting valve when said monitoring means senses a predetermined maximum pressure.

11. The system according to claim 1 wherein said gas storage means is a gas cylinder.

12. The system according to claim 1 wherein said gas storage means includes compartments provided in a supporting framework for the vehicle mounting said system.

* * * * *